US011384032B2

(12) United States Patent
Mazo et al.

(10) Patent No.: US 11,384,032 B2
(45) Date of Patent: Jul. 12, 2022

(54) COMPOSITIONS FOR CONTROLLING ENZYME-INDUCED UREA DECOMPOSITION

(71) Applicant: Verdesian Life Sciences, U.S., LLC, Cary, NC (US)

(72) Inventors: Jacob Mazo, Des Plaines, IL (US); Grigory Mazo, Des Plaines, IL (US)

(73) Assignee: Verdesian Life Sciences, U.S., LLC, Cary, NC (US)

( * ) Notice: Subject to any disclaimer, the term of this patent is extended or adjusted under 35 U.S.C. 154(b) by 453 days.

(21) Appl. No.: 16/300,349

(22) PCT Filed: May 12, 2017

(86) PCT No.: PCT/IB2017/052821
§ 371 (c)(1),
(2) Date: Nov. 9, 2018

(87) PCT Pub. No.: WO2017/195173
PCT Pub. Date: Nov. 16, 2017

(65) Prior Publication Data
US 2019/0144354 A1 May 16, 2019

Related U.S. Application Data

(60) Provisional application No. 62/371,726, filed on Aug. 6, 2016, provisional application No. 62/335,268, filed on May 12, 2016.

(51) Int. Cl.
*C05G 3/90* (2020.01)
*C05C 9/00* (2006.01)
(Continued)

(52) U.S. Cl.
CPC .............. *C05G 3/90* (2020.02); *C05C 1/00* (2013.01); *C05C 9/00* (2013.01); *C05C 9/005* (2013.01); *A01C 21/00* (2013.01)

(58) Field of Classification Search
CPC .. C05C 1/00; C05C 9/00; C05C 9/005; C05G 3/90; A01C 21/00
See application file for complete search history.

(56) References Cited

U.S. PATENT DOCUMENTS 4,701,204 A * 10/1987 Duvdevani .............. C05G 5/37
71/28
5,435,821 A 7/1995 Duvdevani et al.
(Continued)

FOREIGN PATENT DOCUMENTS

JP         616502 A  *  1/1994  ............ A01N 25/10
JP      2006255290 A      9/2006
WO     2015031521 A1     3/2015

OTHER PUBLICATIONS

JP-616502-A English Translation via J-PlatPat (Year: 2020).*
(Continued)

*Primary Examiner* — Wayne A Langel
(74) *Attorney, Agent, or Firm* — Katten Muchin Rosenman LLP

(57) ABSTRACT

Improved urease inhibitors comprise one or more polymers containing alkenylphenyl sulfonate repeat units, which may be applied to or mixed with a variety of urea-containing fertilizers in order to substantially prevent urea decomposition when applied to soil. The inhibitors may be in the form of homopolymers such as polystyrene sulfonate, or as copolymers containing alkenylphenyl sulfonate and other, different repeat units. The inhibitor polymers may be in free acid, partial salt, or complete salt forms, and are water soluble.

27 Claims, 3 Drawing Sheets

(51) Int. Cl.
  *C05C 1/00*   (2006.01)
  *A01C 21/00*  (2006.01)

(56) References Cited

U.S. PATENT DOCUMENTS

| | | | | |
|---|---|---|---|---|
| 6,372,842 B1* | 4/2002 | Grisso | ................ | C09D 5/024 |
| | | | | 524/521 |
| 8,864,867 B2* | 10/2014 | Wells | ................ | C05B 17/00 |
| | | | | 71/11 |
| 2014/0066304 A1* | 3/2014 | Alexander | ............ | A01N 25/00 |
| | | | | 504/128 |
| 2017/0158575 A1* | 6/2017 | Schneider | ............ | C09K 15/06 |

OTHER PUBLICATIONS

PSS Suppliers,"Polystyrene Sulfonic Acid and Polystyrene Sulfonats", 2020, accessed from http://polymerdatabase.com/Polymer%20Brands/PSS.html (Year: 2020).*

Saburova E A et al., "Changes in the activity and structure of urease in the interaction with polyelectrolytes", Russian Journal of Physical Chemistry, Mar. 2008, pp. 468-474, vol. 82.

PCT International Search Report and Written Opinion of the International Searching Authority for application PCT/IB2017/052821 dated Aug. 11, 2017.

* cited by examiner

COMPOSITIONS FOR CONTROLLING ENZYME-INDUCED UREA DECOMPOSITION

FIELD OF THE INVENTION

The present invention is directed to fertilizer compositions including urea and a water soluble alkenylphenyl sulfonate polymer which serves to inhibit the decomposition of urea by the action of urease enzyme. More particularly, the invention is concerned with such compositions, methods of fertilizing soils using the compositions, methods of preparing fertilizer compositions, and methods of inhibiting soil-borne urease through use of an alkenylphenyl sulfonate polymer, such as polystyrene sulfonate.

BACKGROUND

Urea is the most widely used form of nitrogenous fertilizer, and is formulated as dry granules, prills, or as fluids made up of urea alone or mixed with ammonium nitrate as UAN (a mixture containing urea, ammonium nitrate, and water). Urea is also present in animal manures. These forms of urea have a significant disadvantage in that they undergo rapid decomposition and generate ammonia gas when applied to soil. This is due to the presence of urease enzyme in soils, which reacts with urea to produce ammonium bicarbonate and ammonia. This general set of processes is known in the art as volatilization. Volatilization results in decreased efficiency of nitrogen fertilizer use, lower yields, plant symptoms of nitrogen deficiency, undesirable odors, and potentially harmful ammonia gas concentrations.

In response to these problems, considerable research has been done towards the development of urease enzyme inhibitors. For example, catechol, benzoquinone, and related compounds have been shown to be effective urease inhibitors; however, problems relating to cost, safety, convenience, and stability have limited the use of these types of inhibitors. A number of phosphoramide compounds have also long been known to act as effective urease inhibitors. One such compound, N-(n-butyl) thiophosphoric triamide (NBPT) has achieved substantial commercial use in products such as the Agrotain® family of inhibitors.

However, NBPT products require storage at temperatures that do not exceed 36-38° C., which can be problematical for some distributors and users. Moreover, these products may be subjected to temperature conditions during transport or storage, unbeknownst to the ultimate user; in such cases, the products may be substantially below label strengths in terms of active ingredients. Research has also shown that up to 40% of the NBPT content of commercial fertilizer products including NBPT may be lost after storage at 25° C. for three months and, after six months, over 99% of the NBPT content was lost.

Another very important problem related to NBPT urease inhibition is that while it is effective for inhibiting soil-borne urease, it also inhibits urease in plants causing urea to accumulate in plant tissues. This phenomenon is harmful to plants and can result severe tissue necrosis. NBPT can also negatively affect modes of urea uptake and assimilation by plant roots, corn in particular. As such, even when NBPT is successfully used for soil-borne urease inhibition, this may cause a significant decrease in plant yield. In some cases, NBPT inhibitors are not cost effective, in that the expense of purchasing and applying the inhibitors does not result in sufficiently increased yields to justify the usage.

A number of polymeric materials can serve as urease inhibitors. For example, as disclosed in US Patent Publication No. 2008/0173053, carboxylate polymers in partial salt form, and especially maleic-itaconic copolymer salts, may be employed as useful inhibitors. It is believed that these polymers interact with nickel atoms urease enzyme to generate an inhibitory response.

Background references include: U.S. Pat. Nos. 9,249,102, 8,980,893, 8,969,554, 8,951,636, 8,946,270, 8,864,867, 8,841,100, 8,642,636, 8,618,126, 8,575,067, 8,568,505, 8,461,176, 8,426,460, 8,361,184, 8,198,214, 8,197,572, 8,110,017, 5,489,370, and 5,405,509; and US Patent Publications Nos. 2016/0045841, 2015/0366186, 2015/0359221, 2015/0319945, 2015/0203457, 2015/0183785, 2015/0174255, 2015/0158776, 2015/0126/23, 2014/0349375, 2014/0315794, 2014/0179746, 2014/0142114, 2014/0076012, 2013/0111960, 2013/0108872, 2013/0102468, 2013/0065967, 2012/0220667, 2012/0198899, 2011/0269920, 2011/0269919, 2011/0245157, 2011/0226028, 2011/0152312, 2011/0136210, 2011/0105623, 2010/0144859, 2010/0125089, 2009/0229331, 2007/0066487, and 2006/0154824.

Focused searching has developed the following references: U.S. Pat. Nos. 8,241,387, 7,666,241, 7,494,525, 6,489,438, 5,190,797, 4,832,728, 4,789,391, 4,756,738, 4,752,317, 3,565,599, and 2,689,173; US Patent Publications No. 2002/0042346; Foreign Publication Nos. WO 1987006575, WO 1989003811, WO2015031521, WO2015179552; and non-patent literature references Ambrose et al., "Inhibition of Urease by Sulfur Compounds" *JACS*, 1950, Vol. 72, pp 317-321; Lukowska et al., "Preparation of Sulfonated Polysulfone Membrane for Enzymes Immobilisation" *Biocybernetics and Biomedical Engineering*, 2012, Vol. 32, pp 77-86; and Upadhyay, "Urease Inhibitors: A Review" *Indian Journal of Biotechnology*, 2012, Vol. 11, pp 381-388.

PCT Publication WO 89/03811 describes sulfonated polymer coatings used for the preparation of controlled release fertilizer products, such as urea and ammonium sulfate fertilizers. One goal is to reduce nitrogen losses by controlling the release of nitrogen from the coated fertilizers. In order to obtain such controlled or slow-release fertilizer products, it is essential that the applied polymers be essentially water insoluble. As set forth on p. 12, II. 15-29 of the '811 reference, the controlled release coatings include a water insoluble sulfonated polymer dissolved in an organic solvent system. The polymers include a maximum of about 200 milliequivalents (meq.) of pendant sulfonate groups per 100 g of polymer. This translates to a maximum of 25 mole % of pendant sulfonate groups. Usable polymers in accordance with the '811 reference may also include substantial amounts of hydrocarbon (aliphatic and/or aromatic) repeat units, such as butyl, ethylene, propylene, isobutylene, and vinyl repeat units (p. 13, II. 1-20 and pp. 15-16).

There is accordingly a need in the art for improved urease inhibitors which are more effective, are less expensive, and do not have the problems associated with prior products of this type.

SUMMARY OF THE INVENTION

The present invention overcomes the problems outlined above and provides urease inhibitors which can be used in conjunction with nitrogen-containing fertilizers, e.g., urea fertilizers in order to significantly reduce fertilizer urea decomposition. The inhibitor compositions include one or more water soluble polymers having alkenylphenyl sulfonate repeat units in a quantity sufficient to inhibit the decomposition of urea by the action of soil-borne urease enzyme. It has been found that the inhibitors of the invention provide substantially greater urease inhibition at substantially smaller rates of use, as compared with prior art inhibitors, such as NBPT.

The inhibitor polymers may be in the form of homopolymers such as polystyrene sulfonate, or as copolymers including other sulfonated or non-sulfonated repeat units; the latter would advantageously be carboxylate or dicarboxylate repeat units. Moreover, the polymers may be used in free acid, partial salt, or complete salt forms. The amounts of inhibitor polymers used are very small, owing to the very high urease inhibition properties thereof.

The inhibitors may be directly applied to soil, or mixed with solid or liquid urea-containing fertilizers, and applied using conventional techniques. In either case, the inhibitors serve to substantially prevent decomposition of urea.

Polystyrene sulfonate polymers in the free acid or salt (typically sodium or calcium salt) form are highly suitable for use in the invention. Such polymers are commercially available from a number of sources, or can be synthesized using well-known methods.

The useful polymers of the invention have two properties: first, the polymers contain sufficient alkenylphenyl repeat units to provide enhanced inhibition of soil-borne enzyme-induced urea decomposition; and second, the polymers, whatever their repeat unit makeup apart from the necessary presence of alkenylphenyl repeat units, must be sufficiently water soluble.

In embodiments, the subject matter described herein is directed to fertilizer compositions comprising one or more water soluble polymers having alkenylphenyl sulfonate repeat units in a quantity sufficient to inhibit the decomposition of urea by the action of soil-borne urease enzyme.

In embodiments, the subject matter described herein is directed to methods of inhibiting urease activity in soil comprising contacting the soil with one or more water soluble polymers having alkenylphenyl sulfonate repeat units in a quantity sufficient to inhibit the decomposition of urea by the action of soil-borne urease enzyme. The polymers can be admixed with a fertilizer prior to use, such as contacting with the soil.

In embodiments, the subject matter described herein is directed to methods of preparing a nitrogen-containing fertilizer composition comprising one or more water soluble polymers having alkenylphenyl sulfonate repeat units in a quantity sufficient to inhibit the decomposition of urea by the action of soil-borne urease enzyme.

Still other embodiments are described herein.

DETAILED DESCRIPTION

Figure 1:
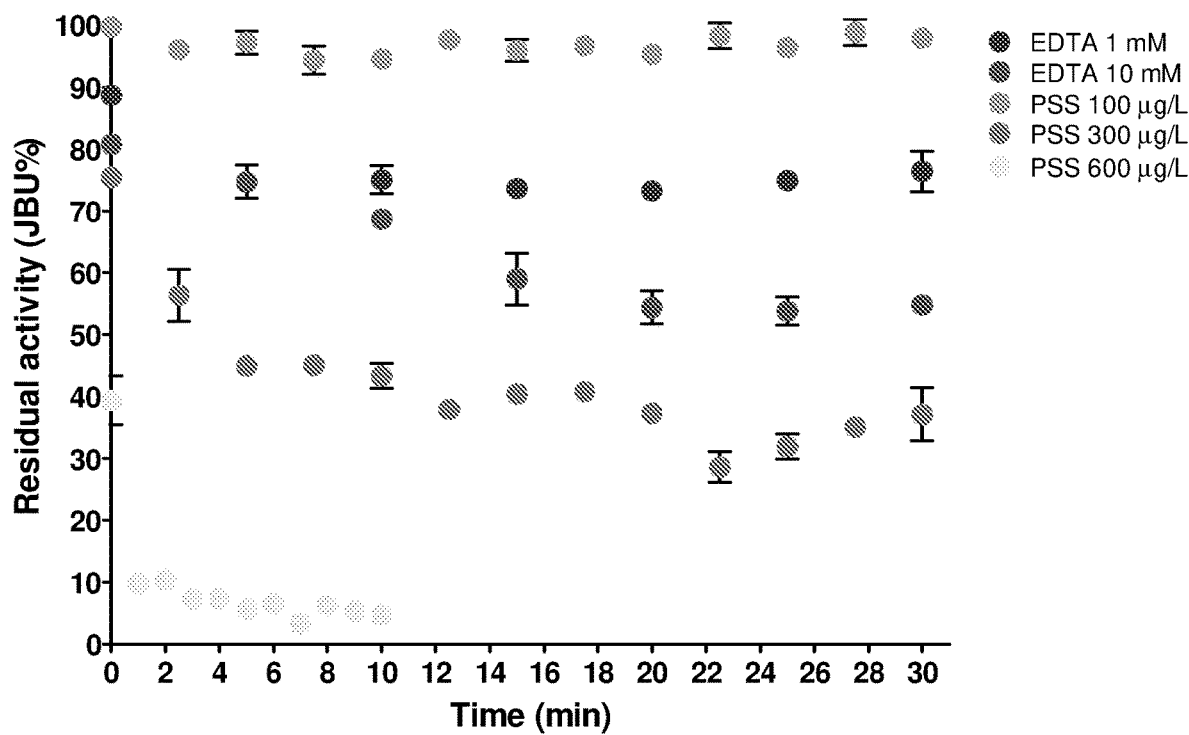
FIG. 1 depicts UV-VIS experiments for the residual activity (%) of urease in the presence of polystyrenesulfonate (PSS) as a function of pre-incubation time. Experimental Conditions: 2 mM MES buffer, pH 5.00, 30 mg $L^{-1}$ Methyl Red (MR) solution and 1% (v/v) DMSO; PSS 250 g $L^{-1}$ (Stock solution); EDTA 250 mM (Stock solution). Sample Preparation: 12 test tubes (50 mL final volume) were prepared as follows: REF (reference)—MR solution, used as enzyme control; EDTA—MR solution containing 1 or 10 mM as final concentration of EDTA; PSS—MR solution containing 100, 300 or 600 μg $L^{-1}$ as final concentration of PSS. 100 μg $L^{-1}$ of PSS appears to have no effects on urease activity. At higher concentrations (300 or 600 μg $L^{-1}$), PSS clearly shows an inhibitory effect on urease activity.
Figure 2:
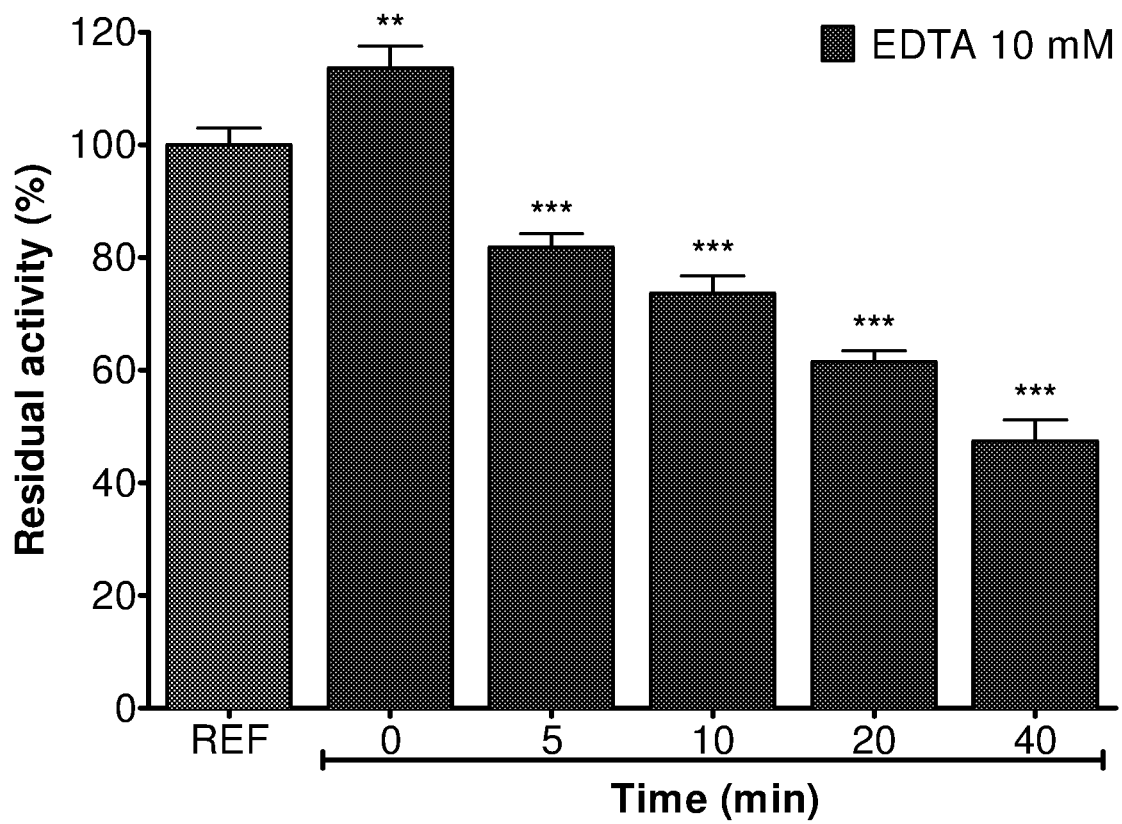
FIG. 2 depicts a pH-STAT experiment for EDTA. Pre-incubation experiment in the presence of 10 mM EDTA. Experimental conditions: 2 mM MES buffer, pH 5.00; PSS 250 g $L^{-1}$. Sample Preparation: REF (reference)—MES buffer, used as enzyme control; PSS—REF also containing 100, 300 or 600 g $L^{-1}$ as final concentration of PSS. Experiment: the measurements were performed after a 0, 5, 10 or 20 min pre-incubation (at room temperature) of urease at increasing concentrations of the polymers. pH-STAT experiments have been performed by using 10 mM EDTA as a positive control for urease inhibition. 10 mM EDTA determines a time-dependent decrease of urease activity. These results are consistent with those of UV-Vis experiments, where a 40 min pre-incubation yields in a 40-50% inhibition.
Figure 3:
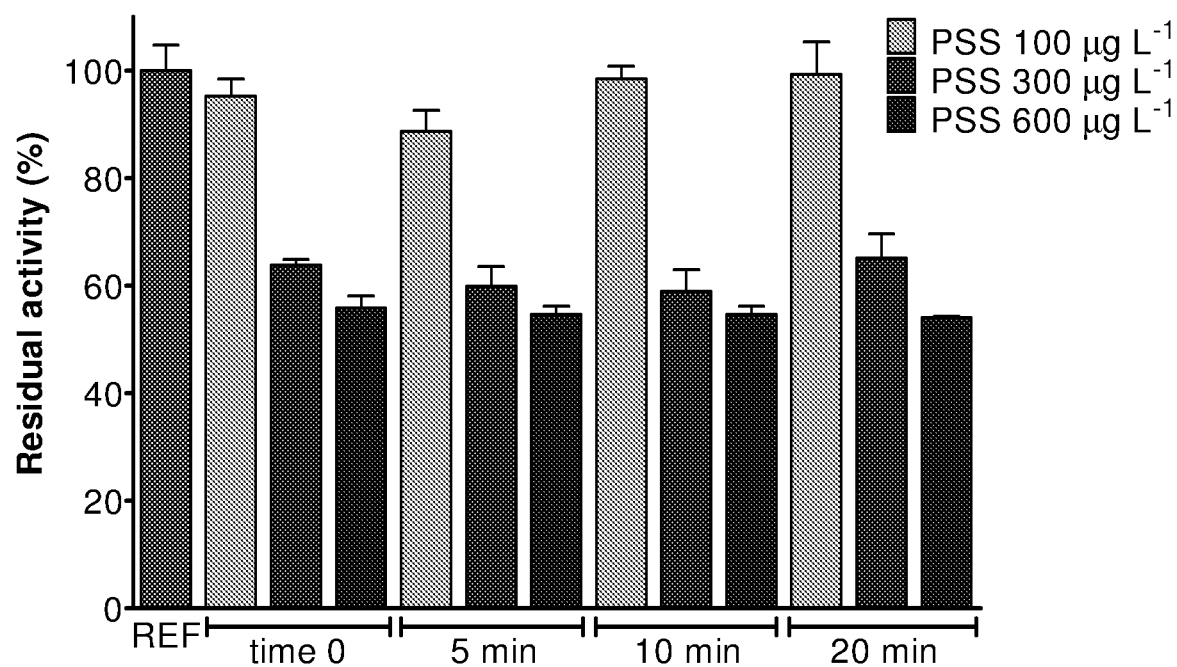
FIG. 3 depicts a pH-STAT experiment for polystyrenesulfonate (PSS). Pre-incubation experiment in the presence of PSS polymer. Experimental conditions: 2 mM MES buffer, pH 5.00; PSS 250 g $L^{-1}$. Sample Preparation: REF (reference)—MES buffer, used as enzyme control; PSS—REF also containing 100, 300 or 600 g $L^{-1}$ as final concentration of PSS. Experiment: the measurements were performed after a 0, 5, 10 or 20 min pre-incubation (at room temperature) of urease at increasing concentrations of the polymers. pH-STAT experiments have been performed by using 10 mM EDTA as a positive control for urease inhibition. The data show PSS polymer provides a concentration-dependent decrease of urease activity. At the highest concentration of PSS (600 μg $L^{-1}$), a 50% inhibition is observable after 20 min of pre-incubation.

The presently disclosed subject matter will now be described more fully hereinafter. However, many modifications and other embodiments of the presently disclosed subject matter set forth herein will come to mind to one skilled in the art to which the presently disclosed subject matter pertains having the benefit of the teachings presented in the foregoing descriptions. Therefore, it is to be understood that the presently disclosed subject matter is not to be limited to the specific embodiments disclosed and that modifications and other embodiments are intended to be included within the scope of the appended claims. In other words, the subject matter described herein covers all alternatives, modifications, and equivalents. In the event that one or more of the incorporated literature, patents, and similar materials differs from or contradicts this application, including but not limited to defined terms, term usage, described techniques, or the like, this application controls. Unless otherwise defined, all technical and scientific terms used herein have the same meaning as commonly understood by one of ordinary skill in this field. All publications, patent applications, patents, and other references mentioned herein are incorporated by reference in their entirety.

Definitions

As used herein, the term "water soluble" refers to a polymer that is dissolves in water at a desirable percentage as disclosed elsewhere herein at ambient temperature and pressure. For example, a water soluble polymer will form a stable solution in water at concentrations of 1% w/w or more.

As used herein, the term "free acid" refers to the state of the polymer wherein the acidic groups on the polymer are fully protonated or in aqueous solution each acidic group may yield a solvated proton. As used herein, the term "partial acid" refers to the state of the polymer wherein a portion of the acidic groups on the polymer are in the salt form. As used herein, the term "complete salt" refers to the state of the polymer wherein all of the acidic groups on the polymer are in the salt form.

As used herein, the term "urease inhibition," "inhibition" or "inhibit" herein is meant to decrease the activity of the urease enzyme, as compared to the activity of that enzyme in the absence of the inhibitor. In some embodiments, the term "inhibit" means a decrease in urease activity of at least about 5%, at least about 10%, at least about 20%, at least about 25%, at least about 50%, at least about 60%, at least about 70%, at least about 80%, at least about 90%, or at least about 95%. In other embodiments, inhibit means a decrease in urease activity of about 5% to about 25%, about 25% to about 50%, about 50% to about 75%, or about 75% to 100%. In some embodiments, inhibit means a decrease in urease activity of about 95% to 100%, e.g., a decrease in activity of 95%, 96%, 97%, 98%, 99%, or 100%. Such decreases can be measured using a variety of techniques that would be recognizable by one of skill in the art, including in vitro urease activity assays, such as the urease decomposition test.

The term "inhibitor polymer" means a polymer or property of a polymer that inhibits activity of urease, and is used to distinguish from a small molecule inhibitor.

The term "fertilizers" is to be understood as chemical compounds applied to promote plant and fruit growth. Fertilizers are typically applied either through the soil (for uptake by plant roots) or by foliar feeding (for uptake through leaves). Fertilizers can be subdivided into two major categories: a) organic fertilizers (composed of decayed plant/animal matter) and b) inorganic fertilizers (composed of chemicals and minerals). Organic fertilizers include slurry, worm castings, peat, seaweed, sewage, and guano. Manufactured organic fertilizers include compost, blood meal, bone meal and seaweed extracts. Further examples are enzymatically digested proteins, fish meal, and feather meal. The decomposing crop residue from prior years is another source of fertility. In addition, naturally occurring minerals such as mine rock phosphate, sulfate of potash and limestone are also considered inorganic fertilizers. Inorganic fertilizers are usually manufactured through chemical processes (such as the Haber-Bosch process), also using naturally occurring deposits, while chemically altering them (e.g. concentrated triple superphosphate). Naturally occurring inorganic fertilizers include Chilean sodium nitrate, mine rock phosphate, and limestone. The term "nitrogen-containing fertilizer" or "fertilizer comprising urea" (urea fertilizers) is defined as synthetic fertilizers comprising urea. Examples of fertilizers comprising urea are urea ammonium nitrate (UAN), isobutylidene diurea (IBDU), crotonylidene diurea (CDU) and urea formaldehyde (UF). Urea is usually made as granulated material or prills. Urea fertilizers can be produced by dropping the liquid urea from a prill tower while drying the product. Urea can also be obtained as a liquid formulation, which may be used for foliar application, e.g. on potatoes, wheat, vegetables and soybeans as well as liquid application to the field. It is commonly mixed with ammonium nitrate to form UAN with 28% N.

The term "locus" (plant habitat) is to be understood as any type of environment, soil, area or material where the plant is growing or intended to grow.

By "contact" or "contacting" it is intended to bring the composition within close enough proximity to the target urease such that the inhibitor is able to interact with the urease. Soil can contacted with the compositions by placing, dropping, spreading, spraying, broadcasting, deep or subsurface placement, localized placement, contact, band, hill, and row placement, knife-in, etc. and any other method. The soil may be in a locus, such as the area near or adjacent to a plant of interest, such as a crop plant.

The term "plant" or "crop plant" is to be understood as plants of economic importance and/or men-grown plants. As used herein, "crop plant" includes cereals (wheat, rice), maize, soya, potatoes, cotton, oilseed rape and fruit species (with the fruits apples, pears, citrus fruit and grapes). Plants of interest include plant species grown for the purposes of providing animal nutrition, including but not limited to various grasses and leguminous plants known to the art of animal nutrition. Such plants may either be harvested in various ways known to the art and subsequently used for animal nutrition, or the plants may be consumed (in whole or in part) by animals while the plants are still growing, or while they are still attached to soil. Plants of interest also include any plant used in productive agriculture and needing a nitrogen nutrient supply as these plants would benefit from the compositions described herein. Plants are preferably selected from agricultural, silvicultural, ornamental and horticultural plants, each in its natural or genetically modified form. The term "plant" or "crop plant" as used herein includes all parts of a plant such as germinating seeds, emerging seedlings, herbaceous vegetation as well as established woody plants including all belowground portions (such as the roots) and aboveground portions.

Preferred agricultural plants are field crops selected from the group consisting of potatoes, sugar beets, wheat, barley, rye, oat, sorghum, rice, maize, cotton, rapeseed, oilseed rape, canola, soybeans, peas, field beans, sunflowers, sugar cane; cucumbers, tomatoes, onions, leeks, lettuce, squashes; even more preferably the plant is selected from the group consisting of wheat, barley, oat, rye, soybean, maize, oilseed rape, cotton, sugar cane, rice and sorghum. In embodiments, the plant to be treated is selected from the group consisting of tomato, potato, wheat, barley, oat, rye, soybean, maize, oilseed rape, canola, sunflower, cotton, sugar cane, sugar beet, rice, sorghum, pasture grass and grassland. In another embodiment, the plant to be treated is selected from the group consisting of tomato, potato, wheat, barley, oat, rye, soybean, maize, oilseed rape, canola, sunflower, cotton, sugar cane, sugar beet, rice and sorghum. In an embodiment, the plants to be treated are selected from the group consisting of tomato, wheat, barley, oat, rye, maize, oilseed rape, canola, sugar cane, and rice. In one embodiment, the plant to be treated is an agricultural plant. "Agricultural plants" are plants of which a part (e.g. seeds) or all is harvested or cultivated on a commercial scale or which serve as an important source of feed, food, fibres (e.g. cotton, linen), combustibles (e.g. wood, bioethanol, biodiesel, biomass) or other chemical compounds. Preferred agricultural plants are for example cereals, e.g. wheat, rye, barley, triticale, oats, sorghum or rice, beet, e.g. sugar beet or fodder beet; fruits, such as pomes, stone fruits or soft fruits, e.g. apples, pears, plums, peaches, almonds, cherries, strawberries, raspberries, blackberries or gooseberries; leguminous plants, such as lentils, peas, alfalfa or soybeans; oil plants, such as rapeseed, oilseed rape, canola, linseed, mustard, olives, sunflowers, coconut, cocoa beans, castor oil plants, oil palms, ground nuts or soybeans; cucurbits, such as squashes, cucumber or melons; fiber plants, such as cotton, flax, hemp or jute; citrus fruit, such as oranges, lemons, grapefruits or mandarins; vegetables, such as spinach, lettuce, asparagus, cabbages, carrots, onions, tomatoes, potatoes, cucurbits or paprika; lauraceous plants, such as avocados, cinnamon or camphor;

energy and raw material plants, such as maize, soybean, rapeseed, canola, sugar cane or oil palm; tobacco; nuts; coffee; tea; bananas; vines (table grapes and grape juice grape vines); hop; turf; natural rubber plants. Pasture grass and grassland are composed of grass or grass mixtures comprising for example Bluegrass (*Poa* spp.), Bentgrass (*Agrostis* spp.), Ryegrasses (*Lolium* spp.), Fescues (*Festuca* spp., hybrids, and cultivars), Zoysiagrass (*Zoysia* spp.), Bermudagrass (*Cynodon* spp.), St. Augustine grass, Bahiagrass (*Paspalum*), Centipedegrass (*Eremachloa*), Carpetgrass (*Axonopus*), Buffalograss and Grama grass. Pastures may be also composed of mixtures comprising afore mentioned grasses, for example Ryegrass, and *Trifolium* species, for example *Trifolium pratensis* and *Trifolium repens, Medicago* species like *Medicago sativa, Lotus* species like *Lotus corniculatus*, and *Melilotus* species, for example *Melilotus albus*. In one embodiment, the plant to be treated according to the method of the invention is a horticultural plant. The term "horticultural plants" are to be understood as plants which are commonly used in horticulture—e.g. the cultivation of ornamentals, vegetables and/or fruits. Examples for ornamentals are turf, geranium, pelargonia, *petunia, begonia* and fuchsia. Examples for vegetables are potatoes, tomatoes, peppers, cucurbits, cucumbers, melons, watermelons, garlic, onions, carrots, cabbage, beans, peas and lettuce and more preferably from tomatoes, onions, peas and lettuce. Examples for fruits are apples, pears, cherries, strawberry, citrus, peaches, apricots and blueberries. In one embodiment, the plant to be treated is an ornamental plant. "Ornamental plants" are plants which are commonly used in gardening, e.g. in parks, gardens and on balconies. Examples are turf, geranium, pelargonia, *petunia, begonia* and fuchsia. In one embodiment, the plant to be treated is a silvicultural plant. The term "silvicultural plant" is to be understood as trees, more specifically trees used in reforestation or industrial plantations. Industrial plantations generally serve for the commercial production of forest products, such as wood, pulp, paper, rubber tree, Christmas trees, or young trees for gardening purposes. Examples for silvicultural plants are conifers, like pines, in particular *Pinus* spec., fir and spruce, *eucalyptus*, tropical trees like teak, rubber tree, oil palm, willow (*Salix*), in particular *Salix* spec., poplar (cottonwood), in particular *Populus* spec., beech, in particular *Fagus* spec., birch, oil palm, and oak.

The term "genetically modified plants" is to be understood as plants, which genetic material has been modified by the use of recombinant DNA techniques in a way that under natural circumstances it cannot readily be obtained by cross breeding, mutations or natural recombination.

The term "plant propagation material" is to be understood to denote all the generative parts of the plant such as seeds and vegetative plant material such as cuttings and tubers (e.g. potatoes), which can be used for the multiplication of the plant. This includes seeds, grains, roots, fruits, tubers, bulbs, rhizomes, cuttings, spores, offshoots, shoots, sprouts and other parts of plants, including seedlings and young plants, which are to be transplanted after germination or after emergence from soil, meristem tissues, single and multiple plant cells and any other plant tissue from which a complete plant can be obtained.

The term "propagules" or "plant propagules" is to be understood to denote any structure with the capacity to give rise to a new plant, e.g. a seed, a spore, or a part of the vegetative body capable of independent growth if detached from the parent. In a preferred embodiment, the term "propagules" or "plant propagules" denotes for seed.

The term "soil" is to be understood as a natural body comprised of living (e.g. microorganisms (such as bacteria and fungi), animals and plants) and non-living matter (e.g. minerals and organic matter (e.g. organic compounds in varying degrees of decomposition), liquid, and gases) that occurs on the land surface, and is characterized by soil horizons that are distinguishable from the initial material as a result of various physical, chemical, biological, and anthropogenic processes. From an agricultural point of view, soils are predominantly regarded as the anchor and primary nutrient base for plants (plant habitat).

An "effective amount" of a urease-inhibiting polymer is the amount that provides the above-mentioned level of inhibition. In embodiments, this can be described in terms of the percentage of polymer in the composition or the ppm of polymer in the material that is to be contacted with the soil. More exemplary information about amounts, ways of application and suitable ratios to be used is given below. The skilled artisan is well aware of the fact that such an amount can vary in a broad range and is dependent on various factors, e.g. the current condition of the treated soil and the type of plant.

The Urease Inhibitor Polymers

The present invention is predicated upon the unexpected discovery that water soluble alkenylphenyl sulfonate polymers have extraordinary capacities to inhibit urease enzyme, to thus largely prevent the decomposition of fertilizer urea via volatilization in the soil; at the same time, the polymers do not substantially interfere with the activity of internal urease within plants. To this end, a variety of such sulfonate polymers may be used, for example, homopolymers made up of alkenylphenyl sulfonate repeat units, or copolymers containing two or more different repeat units of this type, such as maleic-styrene sulfonate copolymers; mixtures of such polymers may also be used. Further, the polymers may be in free acid, partial salt, or complete salt forms. The urease inhibitors of the invention have been shown to be markedly superior as compared with conventional small molecule inhibitors, such as NBPT In some embodiments, polymers in accordance with the invention can have the following idealized general structure:

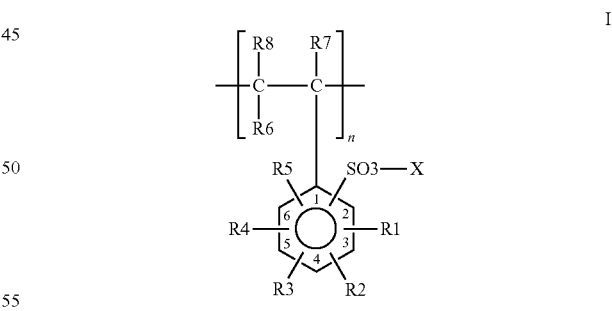

I where R1 through R8 are each independently selected from the group consisting of H, C1-C4 alkyl groups, C1-C4 alkoxy groups, and —SO3-X groups, X is selected from the group consisting of H and salt-forming cations, at least two of R1 through R5, inclusive, are H, and at least one of R6, R7, and R8 is H, and n is from about 5-1500, more preferably from about 70-900. In some embodiments, the —SO3-X substituent is bonded at the 4 position (i.e., in the para position relative to the bond between the hydrocarbon backbone and the phenyl ring), and all of R1 through R8 are H. As is evident from the foregoing formula, the —SO3-X and R1-R5 substituents may be bonded at any of the ring positions 2-6; depending upon the method of synthesis of the polymers, the ring positions of the substituents may vary from repeat unit to repeat unit.

It will also be understood that while the inhibitor polymers are denominated as alkenylphenyl sulfonate polymers, the reference to alkenyl (i.e., olefin) groups therein is based upon the fact that the starting monomers used to synthesize the polymers contain alkenyl moieties. However, these double bonds are eliminated during the polymerization reaction, so that the final polymers do not contain the original alkenyl moieties. This naming convention is common, e.g., polyethylene contains no ethylene groups, and polystyrene contains no styrene groups.

The most useful polymers of the invention should have a weight average molecular weight of from about 1,500-200,000, more preferably from about 15,000-150,000, and most preferably from about 60,000-90,000. If the molecular weights substantially exceed 200,000, or are well below 1,500, urease inhibition performance is significantly lessened. Particular molecular weights include 60 k, 61 k, 62 k, 63 k, 64 k, 65 k, 66 k, 67 k, 68 k, 69 k, 70 k, 71 k, 72 k, 73 k, 74 k, 75 k, 76 k, 77 k, 78 k, 79 k, 80 k, 81 k, 82 k, 83 k, 84 k, 85 k, 86 k, 87 k, 88 k, 89 k and 90 k. Table 1 shows data on the molecular weight of polystyrene sulfate (weight averaged molecular weights), neutral sodium salt and the corresponding percentage of urease inhibition.

TABLE 1

| | PPB | | | | | | | |
|---|---|---|---|---|---|---|---|---|
| Mw, Na salt | 0 | 250 | 500 | 750 | 1000 | 2000 | 3000 | 5000 |
| 200k | 0% | 0% | 0% | 0% | 0% | 0% | 0% | 0% |
| 90k | 0% | 51% | 96% | 98% | 98% | 98% | 97% | 98% |
| 70k | 0% | 41% | 86% | 97% | 98% | 98% | 99% | 98% |
| 40k | 0% | 6% | 57% | 93% | 94% | 98% | 97% | 99% |
| 20k | 0% | 18% | 64% | 85% | 90% | 97% | 98% | 97% |
| 10k | 0% | 0% | 0% | 15% | 36% | 72% | 91% | 97% |
| 0.2k | 0% | 0% | 0% | 0% | 0% | 0% | 0% | 0% |

All materials listed in Table 1 are poly(styrene sulfonate) with molecular weights (Mw) listed as supplied by the manufacturer, and were used as neutral Na salts. Concentrations were listed on free acid basis. Monomeric styrene sulfonate is "0.2 k." Further details are provided in Example 9 below.

In certain embodiments, the polymers should have at least about 25 mole % of alkenylphenyl sulfonate repeat units, preferably where the phenyl groups are pendant to the alkenyl groups, and with a single sulfonated phenyl ring per repeat unit. Each such phenyl ring should have at least one sulfonate substituent group, although multiple sulfonate substituents may also be present. Additionally, other functional substituents or groups may be used on the polymer backbone or on the pendant aromatic rings (e.g., polyanethole sulfonic acid and various salts thereof). In other embodiments, the mole % of alkenylphenyl sulfonate repeat units may be greater than 25%, e.g., at least about 35 mole %, more preferably at least about 50 mole %, and still more preferably at least about 75 mole %. Of course, useful polymers may be made up to consist essentially of, or to consist of, alkenylphenyl sulfonate repeat units. Advantageously, the polymers should exhibit at least about 25% inhibition of urea decomposition, as determined by the urea decomposition test described below.

The polymers of the invention, whatever their specific repeat unit makeup may be apart from alkenylphenyl sulfonate repeat units, should be substantially soluble in water. At a minimum, the polymers should be soluble in water at room temperature to give a true solution having a solids concentration of at least about 1.0% by weight based upon the total weight of the solution taken as 100% by weight, more preferably a solids concentration of at least about 5.0% by weight, still more preferably a solids concentration of at least about 15.0% by weight, and most preferably a solids concentration of at least about 20.0% by weight. In embodiments, the solids concentration is from about 15% to about 60%, or from about 25% to about 50%, or from about 35% to about 45%. Suitable polymers are commercially available, e.g., the sodium p-styrenesulfonate/styrene copolymer ST-6001 (CAS #31619-79-1) sold by Tosoh Organic Chemical Co., Ltd., having a water solubility of about 20-22% w/w.

Thus, while use may be made of alkenylphenyl sulfonate homopolymers such as defined in the above structural Formula I, e.g., polystyrene sulfonate, the invention is not so limited. For example, copolymers synthesized using repeat units of Formula IA below may be used, alone or in combination with other alkenylphenyl sulfonate repeat units and/or a variety of other repeat units (e.g., carboxylate, dicarboxylate, alkyl, alkenyl, and vinyl). Specific examples of dicarboxylate repeat units would be maleic and itaconic repeat units, which may be in the form of acids or anhydrides. In such copolymers, the non-sulfonated repeat units may be present at various mole percentage levels, and/or higher order copolymers may be used, such as ter- or tetrapolymers.

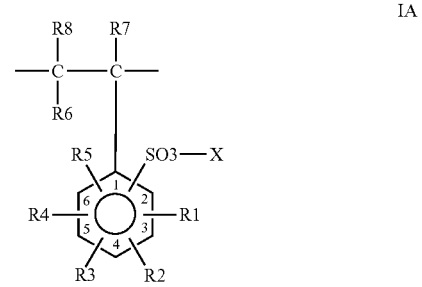

IA where R1 through R8 and X are defined as set forth with respect to Formula I.

Polymer salts may be produced in any suitable manner known in the art. The types of salt-forming cations are not critical, and the X substituent of the above structure may be selected from the group consisting of the alkali metals, alkaline earth metals, transition metals, primary, secondary, and tertiary amines, quaternary amines, ammonia, ammonium ion, and mixtures thereof. The salts may be partial or complete, at the discretion of the user.

By way of illustration, the following structures depict representative free acid (X=H), sodium salt (X=Na), and amine salt (X=NH$_4$) polymers in accordance with the invention, where n is defined above. However, it will be understood by those of skill in the art that the below representations may represent a mole % of the polymer, depending on whether the polymer is a free acid, partial salt, or complete salt.

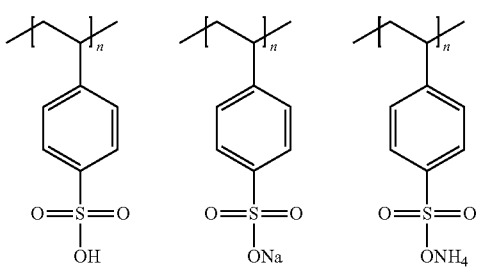

Other polymers can be used in combination with alkenylphenyl sulfonate polymers. For example, maleic-itaconic copolymers such as those described in U.S. Pat. No. 6,515,090, incorporated herein by reference in its entirety, and tetra-polymers comprising itaconic, maleic, and sulfonic moieties other than alkenyl sulfonate, such as those described in U.S. Pat. No. 8,647,406, incorporated herein by reference in its entirety. These polymers can be combined in various ratios of alkenylphenyl sulfonate polymers to co-polymer or tetra-polymer of from 1:100 to 100:1; 1:90 to 90:1; 1:80 to 80:1; 1:70 to 70:1; 1:60 to 60:1; 1:50 to 50:1; 1:40 to 40:1; 1:30 to 30:1; 1:20 to 20:1; 1:10 to 10:1; 1:5 to 5:1; 1:4 or 4:1; 1:3 to 3:1; 1:2 or 2:1; or 1:1. The total amount of inhibitory polymer present in such combination compositions is as described elsewhere herein.

Thus, compositions can contain from about 1% to about 99% of a polystyrene sulfonate as described herein, from about 1% to about 99% of an additional urease-inhibiting polymer (e.g., itaconic-maleic; or tetra-polymer) and additional components, such as, water, colorants, extenders, binders, biocides, biostats, solvents, acceptable excipients, etc. The compositions can be in the forms described elsewhere herein.

An exemplary composition comprises about 45% tetra-polymer, about 5% polystyrene sulfonate, and the balance being made up of about 50% water, and optionally other components. These compositions can be contacted with a nitrogen-containing fertilizer to prepare a fertilizer composition or directly to soil.

Fertilizer Compositions Containing the Urease Inhibitor Polymers and Uses Thereof The inhibitor polymers are typically used in conjunction with nitrogen-containing fertilizers, e.g., fertilizers containing urea, either in direct combination or in situations where the nitrogen-containing fertilizers, e.g., urea fertilizers and inhibitor polymers are applied separately. In either case, the polymers provide a substantial degree of urease inhibition to prevent urea volatilization in soil. The fertilizer compositions may be in solid or liquid form.

The inhibitor polymer and the fertilizer and other components may be co-formulated or formulated separately. If formulated separately, the components are applied in a temporal relationship, i.e. simultaneously or subsequently, whereas the subsequent application is carried out within a time interval which allows the combined action of the components. The subsequent application is carried out with a time interval which allows a combined action of the applied components. Preferably, the time interval for a subsequent application of a first component and a second component ranges from a few seconds up to 1 month, preferably, from a few seconds up to 3 weeks, more preferably from a few seconds up to 1 week, even more preferably from a few seconds up to 3 days and in particular from 1 second up to 24 hours; provided that the time interval allows a combined action of the components. In one embodiment, the components are formulated separately but applied simultaneously or subsequently, whereas the subsequent application is carried out within a time interval which allows a combined action of the individual components. In one embodiment, the components are co-formulated and applied simultaneously or subsequently. In one embodiment, the components are co-formulated and applied simultaneously. Furthermore, the individual active components of the compositions are provided in a kit, such that the user admixes the components in a spray tank and further auxiliaries may be added, if appropriate (tank mix).

The most straightforward urea/polymer compositions include urea per se and/or urea-containing materials, and one or more of the inhibitor polymers in intimate contact with the urea or materials. The urea may be in solid or semi-solid form (e.g., granules, prills, or manures) and, in such instances, the inhibitor polymers may be applied to the surfaces of the urea-containing materials or otherwise intermixed therewith. This may be accomplished by creating liquid dispersions of the inhibitor polymers, which are then sprayed onto the urea-containing materials. In the case of liquid urea products, such as UAN, the inhibitor polymers are usually mixed with the fertilizer liquid in appropriate quantities. In the liquid urea products, the urea is usually present at a level of from about 1-12 moles/L, more preferably from about 2-10 moles/L. Another alternative would be to impregnate urea or urea-containing materials with inhibitor polymer(s) during manufacture of such products.

Generally, in urea/inhibitor polymer compositions, the polymer should be present at a level of from about 0.0002-1% by weight, more preferably from about 0.0005-0.5% by weight, or from about 0.001-0.3% by weight, or from about 0.01-0.1% by weight based upon the total weight of the compositions taken as 100% by weight. While the compositions should contain urea in some form, other types of fertilizers may be used in the compositions, such as any of the well-known NPK fertilizers. Generally, the amount of such secondary fertilizers would be less than that of the urea fraction.

The urea/inhibitor compositions of the invention may be used in exactly the same fashion, and in the same quantities, as the corresponding urea products. In the case of solids, the products may be applied by broadcast, deep or sub-surface placement, localized placement, contact, band, hill, and row placement, before, during, or after planting. Liquid compositions would typically be applied by incorporating the liquid into the soil by knife-in or other conventional methods.

The fertilizer compositions of the invention, as well as the alkenylphenyl sulfonate inhibitor polymers, may also be used with additional active ingredients, such as nitrification/denitrification inhibitors, plant growth regulators, or any other compatible actives.

As mentioned above, it would be possible to separately apply urea fertilizers and the inhibitor polymers of the invention, either simultaneously or in sequential order. In this fashion, the polymers directly inhibit soil-borne urease enzyme. In these types of uses, the inhibitor polymers would be applied at levels sufficient to provide the requisite degree of enzyme inhibition.

In embodiments, the pH of the fertilizer composition is below about 7.0. In embodiments, the pH is below about 6.5, or below about 6.0, or below about 5.75, or below about 5.5. In all of these embodiments having an identified maximum pH, it is preferred that the minimum pH is no less than 1.0, or no less than 2.0, or no less than 3.0, or no less than 4.0, or no less than 4.25, or no less than 4.5, or no less than 4.75, or no less than 4.95, or about 5.0. In embodiments, the pH of the composition is within a range above 4.0 and at or below 5.75, e.g., about 4.75 to about 5.75, or about 5.0 to about 5.75. The pH may be adjusted by either adjusting the pH of the polymer prior to mixing with the nitrogen-containing fertilizer or by adjusting the pH of an admixture of polymer and nitrogen-containing fertilizer. Adjusting the pH of the polymer and/or admixture is accomplished by any conventional means.

The compositions can be in the form of customary types of agrochemical compositions, e.g. solutions, emulsions, suspensions, dusts, powders, pastes, prills and granules. The composition type depends on the particular intended purpose; in each case, it should ensure a fine and uniform distribution of the compounds or the agrochemical mixture according to the invention.

The agrochemical compositions may also comprise auxiliaries which are customary in agrochemical compositions. The auxiliaries used depend on the particular application form and active substance, respectively. Examples for suitable auxiliaries are solvents, solid carriers, dispersants or emulsifiers (such as further solubilizers, protective colloids, surfactants and adhesion agents), organic and anorganic thickeners, bactericides, anti-freezing agents, anti-foaming agents, if appropriate colorants and tackifiers or binders (e.g. for seed treatment formulations).

The compositions can be used as such or in the form of directly sprayable solutions, powders, suspensions, dispersions, emulsions, oil dispersions, pastes, dustable products, materials for spreading, or granules, by means of spraying, atomizing, dusting, spreading, brushing, immersing or pouring. The application forms depend entirely on the intended purposes; it is intended to ensure in each case the finest possible distribution of the active substances according to the invention. Aqueous application forms can be prepared from emulsion concentrates, pastes or wettable powders (sprayable powders, oil dispersions) by adding water. To prepare emulsions, pastes or oil dispersions, the substances, as such or dissolved in an oil or solvent, can be homogenized in water by means of a wetter, tackifier, dispersant or emulsifier. Alternatively, it is possible to prepare concentrates composed of active substance, wetter, tackifier, dispersant or emulsifier and, if appropriate, solvent or oil, and such concentrates are suitable for dilution with water. The concentrations in the ready-to-use preparations can be varied within relatively wide ranges.

Inhibition of Soil-Borne Urease Enzymes by Direct Application of Polymer

The subject matter described herein is directed to a method of inhibiting urease in a soil comprising contacting the soil with an effective amount of a urease inhibiting polymer as described herein. While use of the polymers hereof in conjunction with urea-containing fertilizers is a primary utility of the polymers, it is also possible to directly apply the polymers to soil, in the absence of urea fertilizers. In this fashion, the action of the polymers will inhibit the urease enzymes, allowing later use of urea fertilizers. In this utility, the polymers are typically used at minor levels consistent with the enzyme-inhibiting properties of the polymers, in aqueous dispersion or solution. Thus, the polymers may be applied directly to soil by any convenient technique using aqueous polymer compositions containing from about 0.0002-1% by weight polymer, based upon the total weight of the aqueous composition taken as 100% by weight, and more preferably from about 0.0005-0.5% by weight. In this embodiment, the contacting of the polymer(s) with the soil is in the vicinity of a target plant, such as a crop plant. The method further comprises subsequently contacting the same soil with a nitrogen-containing fertilizer. The method further comprises contacting the soil with a nitrogen-containing fertilizer at the same time as contacting the soil with the polymer(s). In embodiments, the soil can be first contacted with a nitrogen-containing fertilizer and then subsequently with a polymer(s). In this embodiment, the polymer(s) are preferably contacted with the soil within 24 hours of contacting the soil with a fertilizer, or within 12 hours of contacting the soil with a fertilizer, or within 8 hours of contacting the soil with a fertilizer, or within 4 hours of contacting the soil with a fertilizer, or within 2 hours of contacting the soil with a fertilizer.

The inhibitor polymer compositions described herein inhibit urease activity by at least 30% within about 1 hour of contact with urease. In embodiments, inhibitor polymer compositions described herein inhibit urease activity by at least 30% within about 30 minutes of contact with urease. In embodiments, inhibitor polymer compositions described herein inhibit urease activity by at least 30% within about 20 minutes of contact with urease. In embodiments, inhibitor polymer compositions described herein inhibit urease activity by at least 30% within about 15 minutes of contact with urease. In embodiments, inhibitor polymer compositions described herein inhibit urease activity by at least 30% within about 10 minutes of contact with urease. In embodiments, inhibitor polymer compositions described herein inhibit urease activity by at least 30% within about 5 minutes of contact with urease. In embodiments, inhibitor polymer compositions described herein inhibit urease activity by at least 30% within about 1-4 minutes of contact with urease. In embodiments, inhibitor polymer compositions described herein inhibit urease activity by at least 30% within about 1 minute of contact with urease. In embodiments, the level of urease activity at all time periods is from about 30% to about 50%.

In an embodiment, the compositions described herein are useful in hydroponic hydroculture systems. The composition can be added to a hydroponic growth media at concentrations described elsewhere herein. The methods also include contacting a composition comprising an inhibitor polymer as described herein with a root of a plant.

The application of an inhibitor polymer and compositions comprising an inhibitor polymer according to the methods described herein provides significant ecological and economic advantages. The reduction of ammonia and/or $N_2O$ emissions significantly reduces the impact of modern agriculture on the environment as well as on global warming. In addition, losses of nitrogen to the groundwater, risk of eutrophication of lakes and streams are also minimized due to the reduced loss of soil nitrogen.

In embodiments, the inhibitor polymer composition and at least one fertilizer comprising urea is applied before and at sowing, before emergence, and until harvest. In another embodiment, the application is repeatedly carried out. In one embodiment, the application is repeated two to ten times, preferably, two to five times; most preferably two times.

Application rates can be determined by the skilled artisan. Exemplary rates include 0.1 g and 2 kg of inhibitor polymer per hectare, or between 1 g and 0.75 kg of inhibitor polymer per hectare, or between between 2 g and 0.3 kg of inhibitor polymer per hectare. However, the amount per hectare depends on different parameters such as the specific active ingredient applied and the plant species treated.

The subject matter described herein includes the following embodiments:
1. A fertilizer composition including urea and a water soluble polymer having alkenylphenyl sulfonate repeat units, said polymer present in a quantity sufficient to inhibit the decomposition of said urea by the action of soil-borne urease enzyme.
2. The composition of embodiment 1, said polymer having at least about 25 mole % of said alkenylphenyl sulfonate repeat units.
3. The composition of any above embodiment, at least some of said alkenylphenyl sulfonate repeat units having a single pendant phenyl group substituted with one or more sulfonate groups.
4. The composition of any above embodiment, said alkenylphenyl sulfonate repeat units including styrene sulfonate repeat units.
5. The composition of any above embodiment, said polymer having the general formula

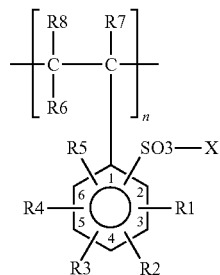

where R1 through R8 are each independently selected from the group consisting of H, C1-C4 alkyl groups, C1-C4 alkoxy groups, and —SO3-X groups, X is selected from the group consisting of H and salt-forming cations, at least two of R1 through R5, inclusive, are H, and at least one of R6, R7, and R8 is H, and n is from about 5-1500.
6. The composition of any above embodiment, wherein the —SO3-X group is bonded at the 4 position and R1 through R8 are H.
7. The composition of any above embodiment, said polymer being in free acid, partial salt, or complete salt form.
8. The composition of any above embodiment, said polymer being in partial or complete salt form, said salt-forming cations selected from the group consisting of the alkali metals, alkaline earth metals, transition metals, primary, secondary, and tertiary amines, quaternary amines, ammonia, ammonium ion, and mixtures thereof.
9. The composition of any above embodiment, said polymer having a weight average molecular weight of from about 1,500-200,000.
10. The composition of any above embodiment, said molecular weight being from about 15,000-150,000 or from about 60,000 to about 90,000.
11. The composition of any above embodiment, said polymer being a homopolymer.
12. The composition of any above embodiment, said polymer being a copolymer containing at least two different repeat units.
13. The composition of any above embodiment, said repeat units selected from the group consisting of alkenylphenyl sulfonate, carboxylate, and vinyl repeat units.
14. The composition of any above embodiment, one of said repeat units being styrene sulfonate, and another of said repeat units being a dicarboxylate repeat unit.
15. The composition of any above embodiment, at least about 25 mole % of the repeat units of said polymer being alkenylphenyl sulfonate repeat units.
16. The composition of any above embodiment, at least about 50 mole % of said repeat units being alkenylphenyl sulfonate repeat units.
17. The composition of any above embodiment, said polymer being present at a level of from about 0.0002-1% by weight, based upon the total weight of the composition taken as 100% by weight.
18. The composition of any above embodiment, said level being from about 0.0005-0.5% by weight.
19. The composition of any above embodiment, including at least one additional ingredient selected from the group consisting of polymers different than said alkenylphenyl sulfonate polymer, other urease inhibitors, other fertilizers, solvents, colorants, film formers, and mixtures thereof.
20. The composition of any above embodiment, said composition in the form of an aqueous dispersion.
21. The composition of any above embodiment, said urea being present in the composition at a level of from about 1-12 moles/L.
22. The composition of any above embodiment, said level being from about 2-10 moles/L.
23. The composition of any above embodiment, said composition comprising one or more solid fertilizers, including solid urea, said polymer applied to the surfaces of said solid fertilizers.
24. The composition of any above embodiment, said polymer being present at a level of from about 0.0002-1% by weight, based upon the total weight of the composition taken as 100% by weight.
25. The composition of any above embodiment, including manure as a source of said urea.
26. The composition of any above embodiment, said polymer being soluble in water at room temperature to give a true solution having a solids concentration of at least about 1.0% by weight.
27. The composition of any above embodiment, said polymer being soluble in water at room temperature to give a true solution having a solids concentration of at least about 15.0% by weight.
28. The composition of any above embodiment, said fertilizer comprising UAN.
29. A method of fertilizing soil comprising the step of applying to the soil a composition in accordance with claim 1.
30. A method of preparing a fertilizer composition comprising the step of adding to a fertilizer comprising urea an alkenylphenyl sulfonate polymer urease inhibitor in a quantity sufficient to inhibit the decomposition of said urea by the action of urease enzyme, said polymer being water soluble.
31. Any above method wherein, said polymer having at least about 25 mole % of said alkenylphenyl sulfonate repeat units.
32. Any above method wherein, at least some of said alkenylphenyl sulfonate repeat units having a single pendant phenyl group substituted with one or more sulfonate groups.
33. Any above method wherein, said alkenylphenyl sulfonate repeat units including styrene sulfonate repeat units.

34. Any above method wherein, said polymer having the general formula

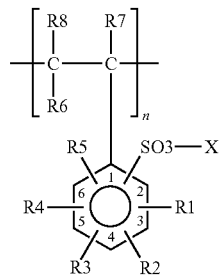

where R1 through R8 are each independently selected from the group consisting of H, C1-C4 alkyl groups, C1-C4 alkoxy groups, and —SO3-X groups, X is selected from the group consisting of H and salt-forming cations, at least two of R1 through R5, inclusive, are H, and at least one of R6, R7, and R8 is H, and n is from about 5-1500.
35. Any above method wherein, wherein the —SO3-X group is bonded at the 4 position and R1 through R8 are H.
36. Any above method wherein, said polymer being in free acid, partial salt, or complete salt form.
37. Any above method wherein, said polymer being in partial or complete salt form, said salt-forming cations selected from the group consisting of the alkali metals, alkaline earth metals, transition metals, primary, secondary, and tertiary amines, quaternary amines, ammonia, ammonium ion, and mixtures thereof.
38. Any above method wherein, said polymer having a weight average molecular weight of from about 1,500-200,000.
39. Any above method wherein, said molecular weight being from about 15,000-150,000, or from about 60,000-90,000.
40. Any above method wherein, said polymer being a homopolymer.
41. Any above method wherein, said polymer being a copolymer containing at least two different repeat units.
42. Any above method wherein, said repeat units selected from the group consisting of alkenylphenyl sulfonate, carboxylate, and vinyl repeat units.
43. Any above method wherein, one of said repeat units being styrene sulfonate, and another of said repeat units being a dicarboxylate repeat unit.
44. Any above method wherein, at least about 25 mole % of the repeat units of said polymer being alkenylphenyl sulfonate repeat units.
45. Any above method wherein, at least about 50 mole % of said repeat units being alkenylphenyl sulfonate repeat units.
46. Any above method wherein, said polymer being present at a level of from about 0.0002-1% by weight, based upon the total weight of the composition taken as 100% by weight.
47. Any above method wherein, said level being from about 0.0005-0.5% by weight.
48. Any above method wherein, including at least one additional ingredient selected from the group consisting of polymers different than said alkenylphenyl sulfonate polymer, other urease inhibitors, other fertilizers, solvents, colorants, film formers, and mixtures thereof.
49. Any above method wherein, said composition in the form of an aqueous dispersion.
50. Any above method wherein, said urea being present in the composition at a level of from about 1-12 moles/L.
51. Any above method wherein, said level being from about 2-10 moles/L.
52. Any above method wherein, said composition comprising one or more solid fertilizers, including solid urea, said polymer applied to the surfaces of said solid fertilizers.
53. Any above method wherein, said polymer being present at a level of from about 0.0002-1% by weight, based upon the total weight of the composition taken as 100% by weight.
54. Any above method, including manure as a source of said urea.
55. Any above method wherein, said polymer being soluble in water at room temperature to give a true solution having a solids concentration of at least about 1.0% by weight.
56. Any above method wherein, said polymer being soluble in water at room temperature to give a true solution having a solids concentration of at least about 15.0% by weight.
57. Any above method wherein, said fertilizer comprising UAN.
58. A method of inhibiting soil-borne urease enzyme comprising the step of applying to the soil a water soluble polymer having alkenylphenyl sulfonate repeat units, said polymer present in a quantity sufficient to inhibit the decomposition of said urea by the action of soil-borne urease enzyme.
59. Any above method wherein, said polymer having at least about 25 mole % of said alkenylphenyl sulfonate repeat units.
60. Any above method wherein, at least some of said alkenylphenyl sulfonate repeat units having a single pendant phenyl group substituted with one or more sulfonate groups.
61. Any above method wherein, said alkenylphenyl sulfonate repeat units including styrene sulfonate repeat units.
62. Any above method wherein, said polymer having the general formula

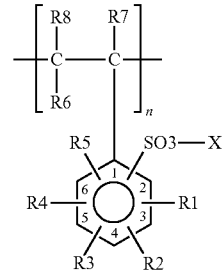

where R1 through R8 are each independently selected from the group consisting of H, C1-C4 alkyl groups, C1-C4 alkoxy groups, and —SO3-X groups, X is selected from the group consisting of H and salt-forming cations, at least two of R1 through R5, inclusive, are H, and at least one of R6, R7, and R8 is H, and n is from about 5-1500.
63. Any above method wherein, wherein the —SO3-X group is bonded at the 4 position and R1 through R8 are H.
64. Any above method wherein, said polymer being in free acid, partial salt, or complete salt form.
65. Any above method wherein, said polymer being in partial or complete salt form, said salt-forming cations selected from the group consisting of the alkali metals, alkaline earth metals, transition metals, primary, secondary, and tertiary amines, quaternary amines, ammonia, ammonium ion, and mixtures thereof.

66. Any above method wherein, said polymer having a weight average molecular weight of from about 1,500-200,000.
67. Any above method wherein, said molecular weight being from about 15,000-150,000, or 60,000 to 90,000.
68. Any above method wherein, said polymer being a homopolymer.
69. Any above method wherein, said polymer being a copolymer containing at least two different repeat units.
70. Any above method wherein, said repeat units selected from the group consisting of alkenylphenyl sulfonate, carboxylate, and vinyl repeat units.
71. Any above method wherein, one of said repeat units being styrene sulfonate, and another of said repeat units being a dicarboxylate repeat unit.
72. Any above method wherein, at least about 25 mole % of the repeat units of said polymer being alkenylphenyl sulfonate repeat units.
73. Any above method wherein, at least about 50 mole % of said repeat units being alkenylphenyl sulfonate repeat units.
74. Any above method wherein, said polymer being present at a level of from about 0.0002-1% by weight, based upon the total weight of the composition taken as 100% by weight.
75. Any above method wherein, said level being from about 0.0005-0.5% by weight.
76. Any above method wherein, said composition in the form of an aqueous dispersion.
77. Any above method wherein, said polymer being soluble in water at room temperature to give a true solution having a solids concentration of at least about 1.0% by weight.
78. Any above method wherein, said polymer being soluble in water at room temperature to give a true solution having a solids concentration of at least about 15.0% by weight.
79. The composition of any above embodiment, said polymer providing at least about 25% inhibition of the decomposition of said urea, using the urea decomposition test.

EXAMPLES

The following examples set forth uses of the inhibitor polymers in accordance with the present invention. It is to be understood, however, that these examples are provided by way of illustration only, and nothing therein should be taken as a limitation upon the overall scope of the invention.

Example 1

A solution was prepared by adjusting an aqueous solution containing 0.105 moles/L of monosodium phosphate with sodium hydroxide to give a pH of 5.0. 19 mL aliquots of this solution were then placed in each of three glass containers, A, B, and C. Container A was supplemented with 10.0 microliters of a 1.0% aqueous solution of a commercially available sodium polystyrene sulfonate polymer having a weight average molecular weight of about 70,000, to give a concentration of 5.0 ppm of the polymer. Thereafter, an aliquot of commercially available jack bean urease enzyme solution was added to the container in order to add 40 units of enzyme. This Container was covered and allowed to stand for 5 hours at 20° C., whereupon 1.0 mL of freshly prepared urea solution in water (2.0 moles/L) was added, to give an overall reaction concentration of 0.100 moles/L for both urea and phosphate.

Container B was supplemented with urea and enzyme in the same amounts as Container A, but with no polymer, and the Container was covered and allowed to stand for 5 hours at 20° C. Container C was supplemented with urea only in the same amount as Container A, but with no polymer or enzyme, and again was covered and allowed to stand for 5 hours at 20° C.

Thus, the three Containers had:
Container A—phosphate, polymer, urea, enzyme
Container B—phosphate, urea, enzyme
Container C—phosphate, urea Solution urea concentrations were measured accurately in each of the three solutions in Containers A, B, and C, immediately after preparation of the solutions and after a 60-minute interval upon standing at 20° C. The urea concentration in the enzyme-free solution of Container C was unchanged (less than 1.0% change from the original reading) after 60 minutes. The concentration of urea in the enzyme-containing solution of Container B dropped by about 60%. The concentration in the solution containing the polymer of Container A was also unchanged, again less than 1.0% from the original reading after 60 minutes. The urea concentrations in Containers A, B, and C were again tested after 24 hours of standing at 20° C., with the result that the concentration in Containers A and C were substantially identical, less than 2.25% change from the original readings; however, the urea concentration in Container B was less than 0.1% of the original concentration, as expected.

This Example illustrates that the addition of polymer essentially completely prevents decomposition of urea, in that the urea-only Container C had essentially the same decomposition as Container A containing the polymer, urea, and enzyme.

Example 2

An aqueous composition was prepared composed of: (1) a substantially equimolar maleic-itaconic copolymer in acid form and having a weight average molecular weight of about 3,000 Da; and (2) the polystyrene sulfonate polymer of Example 1 in acid form having a weight average molecular weight of about 70,000 Da. These polymers were present at a level of 5.0% w/w each in water (90% w/w). The polymer solution was reacted with sufficient calcium hydroxide in room temperature with stirring in an open vessel to yield a partial salt mixture having a pH of 2.0. This solution was then concentrated by evaporation to a total solids concentration of 15% w/w.

Example 3

The partial salt composition of Example 2 was used to treat a urea-ammonium nitrate liquid fertilizer (UAN or 32-0-0), by adding 0.5 mL of the Example 3 product to 99.5 mL of UAN with stirring to give a clear solution. This treated UAN may be applied to soil as a nitrogen source for plants.

Example 4

In this test, the identical solutions of Container A, B, and C of Example 1 were prepared, along with a comparative Container D having the same contents as Container A except that a solution of NBPT was added to give a concentration of 50 ppm NBPT on an actives basis, in lieu of the polystyrene sulfonate polymer of Container A. Accordingly, the concentration of NBPT in Container D was ten times greater than the amount of polymer in Container A. All Containers were then covered and allowed to stand for 24 hours at 20° C. Thereupon, a 1.0 mL aliquot of freshly prepared urea solution (2.0 moles/L) was added to each Container to give an overall reaction concentration of 0.10 moles/L for both urea and phosphate in all Containers.

Solution urea concentrations in Containers A and D were measured immediately and after a 180-minute interval of covered standing at 20° C., giving the following urea concentrations:

Container A—essentially unchanged, less than 1% change from the original reading
Container D—substantially the same, less than 3% change from the original reading.

After 120 hours of covered standing at 20° C., the urea concentrations of all four Containers were measured, giving the following urea concentrations:

Container A—substantially the same, less than 3% change from the original reading
Container B—less than 0.1% of the original concentration
Container C—substantially the same, less than 3% change from the original reading
Container D—73% of the original concentration.

Example 5

This test is very similar to that of Example 4 except that the stand time was increased to 260 hours, and an additional Container E was prepared, which was identical to Container D except that it contained only 5 ppm NBPT on an actives basis. The following results were observed.

Container A—substantially unchanged, less than 4% change from original reading, after 260 hours
Container B—less than 0.1% of the original concentration at 3 hours into the stand time
Container C—substantially unchanged after 260 hours
Container D—38% of the original concentration after 260 hours
Container E—1% of the original concentration after 260 hours The Example 4 and 5 tests confirm that the use of polymers in accordance with the invention is substantially superior to the prior art NBPT material in terms of preventing urea decomposition over extended periods, even when the polymers of the invention are employed at substantially smaller concentrations as compared with NBPT. That is, use of the polymer is approximately 10 times better than the prior art NBPT material, even when the latter is used at a level 10 times greater than that of the polymer.

Example 6

An aqueous composition was prepared composed of: (1) tetrapolymer T5 as described in U.S. Pat. No. 8,647,406, without any additional neutralization following the polymerization process described therein and having a weight averaged molecular weight of about 3,000 Da and (2) the polystyrene sulfonate polymer of Example 1 in acid form having a weight average molecular weight of about 70,000 Da. 69.2 g of tetrapolymer T5 solution (about 65% w/w, aqueous) was mixed with 27.8 g of polystyrene sulfonate solution (about 18% w/w, aqueous), and the mixture was diluted with deionized water to a total weight of 100.0 g to give a dark yellow, slightly viscous solution. The composition of this solution was as follows: 45% T5 tetrapolymer, 5% polystyrene sulfonate, balance water.

Example 7

The composition of Example 6 was used to treat a urea-ammonium nitrate liquid fertilizer (UAN or 32-0-0), by adding 1.0 mL of the Example 6 product to 99.0 mL of UAN with stirring to give a clear solution. This treated UAN may be applied to soil as a nitrogen source for plants. UAN pH during this procedure decreased from about 7.5 (untreated UAN) to about 4.0 (treated UAN).

Example 8

The composition of Example 6 was used to treat commercial granular urea fertilizer by coating about 0.25 ml of the composition onto about 100 g of urea granules. This treated urea may be applied to soil as a nitrogen source for plants.

Example 9

The experiments were conducted in the same general manner as shown in Example 1, with the following changes:
  incubation time of urease enzyme with polymer prior to urea addition: 18 hours.
  treatment (PSS) concentration in test solution: as indicated in table, in PPB.
  urea concentration readings were taken as described in Example 1, but only the immediate and the first 60 minute interval one, after which the experiment was terminated; this allowed calculation of urea loss rate per hour.
  % inhibition (as listed in table) was measured by comparing urea loss rates for the samples listed, with 0% inhibition urea loss rate being that produced by urease enzyme without inhibitor, and 100% inhibition urea loss rate being that produced by urea solution lacking enzyme
  results for all the materials tested at each of the concentrations listed were tabulated, see Table 1.
  PPB is parts per billion.

Those skilled in the art will appreciate that the utility of polymer-supplemented urea compositions in accordance with the invention, at dosage rates far lower than heretofore deemed necessary with prior art products, can be exploited in a number of ways. For example, costs can be substantially reduced by using only very minor amounts of the polymers, or alternately much greater inhibition of urea decomposition can be achieved with similar amounts as compared with the prior art. Importantly, the extended stand times of Example 5 versus Example 4 confirms that the compositions of the invention are capable of acting over periods much greater than those of the prior art.

As demonstrated by the above Examples, the polymers of the invention provide unexpected degrees of inhibition of enzyme-induced urea decomposition, when used with urea-containing fertilizer. In some embodiments, the polymers give at least about 25% inhibition of urea decomposition, more preferably at least about 50% inhibition, and still more preferably at least about 70% inhibition, as compared with the decomposition of the urea-containing fertilizer in the absence of the polymer. The degree of this inhibition for a particular polymer in accordance with the invention can readily be determined by the following test:

(1) A solution is prepared by adjusting an aqueous solution containing 0.105 moles/L of monosodium phosphate, using sodium hydroxide to give the solution a pH of 5.0.

(2) A 19 ml aliquot of this solution is placed in each of two glass Containers A and B.

(3) 10.0 microliters of a 1% by weight aqueous solution of the polymer to be tested is added to Container A, to give a concentration of 5.0 ppm of polymer.

(4) An aliquot of jack bean urease enzyme solution is added to Containers A and B at a level of 40 units of enzyme.

(5) Containers A and B are covered and allowed to stand for 24 hours at an ambient temperature of 20° C.

(6) At the end of the 24-hour standing period, urea concentrations of Containers A and B are measured, and the extent of inhibition of urea decomposition provided by the polymer in Container A, versus the urea decomposition in Container B, is calculated as a percentage of non-degraded urea present in Container A minus the percentage of non-degraded urea in Container B. For example, if Container A contains 90% of the original amount of urea and Container B contains 5% of the original amount of urea, the extent of inhibition of urea decomposition provided by the test polymer is 90% minus 5%, or 85%. The above test is referred to herein as the "urea decomposition test."

All technical and scientific terms used herein have the same meaning. Efforts have been made to ensure accuracy with respect to numbers used (e.g. amounts, temperature, etc.) but some experimental errors and deviations should be accounted for.

Throughout this specification and the claims, the words "comprise," "comprises," and "comprising" are used in a non-exclusive sense, except where the context requires otherwise. It is understood that embodiments described herein include "consisting of" and/or "consisting essentially of" embodiments.

As used herein, the term "about," when referring to a value is meant to encompass variations of, in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Where a range of values is provided, it is understood that each intervening value, to the tenth of the unit of the lower limit, unless the context clearly dictates otherwise, between the upper and lower limit of the range and any other stated or intervening value in that stated range, is encompassed. The upper and lower limits of these small ranges which may independently be included in the smaller rangers is also encompassed, subject to any specifically excluded limit in the stated range. Where the stated range includes one or both of the limits, ranges excluding either or both of those included limits are also included.

Many modifications and other embodiments set forth herein will come to mind to one skilled in the art to which this subject matter pertains having the benefit of the teachings presented in the foregoing descriptions and the associated drawings. Therefore, it is to be understood that the subject matter is not to be limited to the specific embodiments disclosed and that modifications and other embodiments are intended to be included within the scope of the appended claims. Although specific terms are employed herein, they are used in a generic and descriptive sense only and not for purposes of limitation.

We claim:

1. A fertilizer composition including urea and a water soluble polymer having alkenylphenyl sulfonate repeat units, said polymer present in a quantity sufficient to inhibit the decomposition of said urea by the action of soil-borne urease enzyme, the composition including at least one additional polymer comprising no alkenylphenyl sulfonate repeat units which is different than said water soluble alkenylphenyl sulfonate polymer, wherein said additional polymer is selected from:

a copolymer comprising maleic and itaconic repeat units; or a tetrapolymer comprising itaconic, maleic, and sulfonic moieties other than alkenyl sulfonates.

2. The composition of claim 1, said water soluble polymer

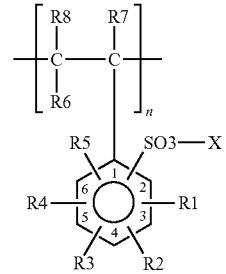

having the general formula where R1 through R8 are each independently selected from the group consisting of H, C1-C4 alkyl groups, C1-C4 alkoxy groups, and —SO3-X groups, X is selected from the group consisting of H and salt-forming cations, at least two of R1 through R5, inclusive, are H, and at least one of R6, R7, and R8 is H, and n is from about 5-1500.

3. The composition of claim 2, wherein the —SO3-X group is bonded at the 4 position and R1 through R8 are H.

4. The composition of claim 1, said water soluble polymer being in free acid, partial salt, or complete salt form.

5. The composition of claim 4, said water soluble polymer being in partial or complete salt form, said salt-forming cations selected from the group consisting of the alkali metals, alkaline earth metals, transition metals, primary, secondary, and tertiary amines, quaternary amines, ammonia, ammonium ion, and mixtures thereof.

6. The composition of claim 1, said water soluble polymer having a weight average molecular weight of from about 1500-200,000.

7. The composition of claim 1, said water soluble polymer being a homopolymer.

8. The composition of claim 1, said water soluble polymer being a copolymer containing at least two different repeat units.

9. The composition of claim 8, said repeat units selected from the group consisting of alkenylphenyl sulfonate, carboxylate, and vinyl repeat units.

10. The composition of claim 8, one of said repeat units being styrene sulfonate, and another of said repeat units being a dicarboxylate repeat unit.

11. The composition of claim 8, at least about 25 mole % of the repeat units of said polymer being alkenylphenyl sulfonate repeat units.

12. The composition of claim 1, said water soluble polymer being present at a level of from about 0.0002-1% by weight, based upon the total weight of the composition taken as 100% by weight.

13. The composition of claim 1, including at least one additional ingredient selected from the group consisting of other urease inhibitors, other fertilizers, solvents, colorants, film formers, and mixtures thereof.

14. The composition of claim 1, said composition in the form of an aqueous dispersion.

15. The composition of claim 14, said urea being present in the composition at a level of from about 1-12 moles/L.

16. The composition of claim 1, said composition comprising one or more solid fertilizers, including solid urea, said water soluble polymer applied to the surfaces of said solid fertilizers.

17. The composition of claim 16, said water soluble polymer being present at a level of from about 0.0002-1% by weight, based upon the total weight of the composition taken as 100% by weight.

18. The composition of claim 1, including manure as a source of said urea.

19. The composition of claim 1, said water soluble polymer being soluble in water at room temperature to give a true solution having a solids concentration of at least about 1.0% by weight.

20. The composition of claim 1, said fertilizer comprising UAN.

21. A method of fertilizing soil comprising the step of applying to the soil a composition in accordance with claim 1.

22. A method of preparing a fertilizer composition of claim 1 comprising the step of adding to a fertilizer comprising urea, an alkenylphenyl sulfonate polymer urease inhibitor, and at least one additional polymer comprising no alkenylphenyl sulfonate repeat units which is different than said water soluble alkenylphenyl sulfonate polymer, wherein said additional polymer is selected from:
   a copolymer comprising maleic and itaconic repeat units; or
   a tetrapolymer comprising itaconic, maleic, and sulfonic moieties other than alkenyl sulfonates,
   in quantities sufficient to inhibit the decomposition of said urea by the action of urease enzyme, said polymers being water soluble.

23. A method of inhibiting soil-borne urease enzyme comprising the step of applying to the soil a water soluble polymer having alkenylphenyl sulfonate repeat units, said polymer present in a quantity sufficient to inhibit the decomposition of said urea by the action of soil-borne urease enzyme, and at least one additional polymer comprising no alkenylphenyl sulfonate repeat units which is different than said water soluble alkenylphenyl sulfonate polymer, wherein said additional polymer is selected from: a copolymer comprising maleic and itaconic repeat units; or a tetrapolymer comprising itaconic, maleic, and sulfonic moieties other than alkenyl sulfonates.

24. The method of claim 23, said water soluble polymer having at least about 25 mole % of said alkenylphenyl sulfonate repeat units.

25. The method of claim 23, said water soluble polymer having the general formula

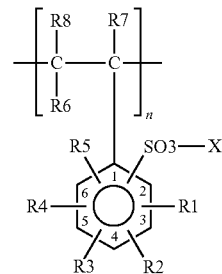

where R1 through R8 are each independently selected from the group consisting of H, C1-C4 alkyl groups, C1-C4 alkoxy groups, and —SO3-X groups, X is selected from the group consisting of H and salt-forming cations, at least two of R1 through R5, inclusive, are H, and at least one of R6, R7, and R8 is H, and n is from about 5-1500.

26. The method of claim 23, said water soluble polymer being a homopolymer.

27. The method of claim 23, said water soluble polymer being a copolymer containing at least two different repeat units.

* * * * *